United States Patent [19]

Antos et al.

[11] Patent Number: 4,805,660

[45] Date of Patent: Feb. 21, 1989

[54] VENT STRUCTURE FOR FLUSH WATER HOLDING TANK OF VEHICLE TOILETS

[75] Inventors: John M. Antos, Ann Arbor; David B. Cameron, Milford, both of Mich.

[73] Assignee: Thetford Corporation, Ann Arbor, Mich.

[21] Appl. No.: 118,562

[22] Filed: Nov. 9, 1987

[51] Int. Cl.$^4$ ............................................. F16K 33/18
[52] U.S. Cl. ........................................ 137/202; 4/321
[58] Field of Search ................... 137/202; 4/300, 321, 4/378, 459, 460; 296/150

[56] References Cited

U.S. PATENT DOCUMENTS 2,285,581  6/1942  Horton ................................ 137/205
2,893,412  7/1959  Fox .................................... 137/202 X
4,108,380  8/1978  Richardson ...................... 137/202 X
4,508,550  4/1985  Berfield ........................... 137/202 X Primary Examiner—Alan Cohan
Attorney, Agent, or Firm—Harness, Dickey & Pierce

[57] ABSTRACT

An improved vent structure for a toilet which is normally open but automatically closable depending on the water level whereby to prevent unwanted spills allows air to escape from the interior of a flush water holding tank. A cruciform shaped stem including a buoyant body attached thereto reciprocates in a bore, and a seal, provided by an interior bellows or by the buoyant body, closes the air path when the stem is buoyed upwardly by a rise in the water level.

7 Claims, 1 Drawing Sheet

U.S. Patent
Feb. 21, 1989
4,805,660
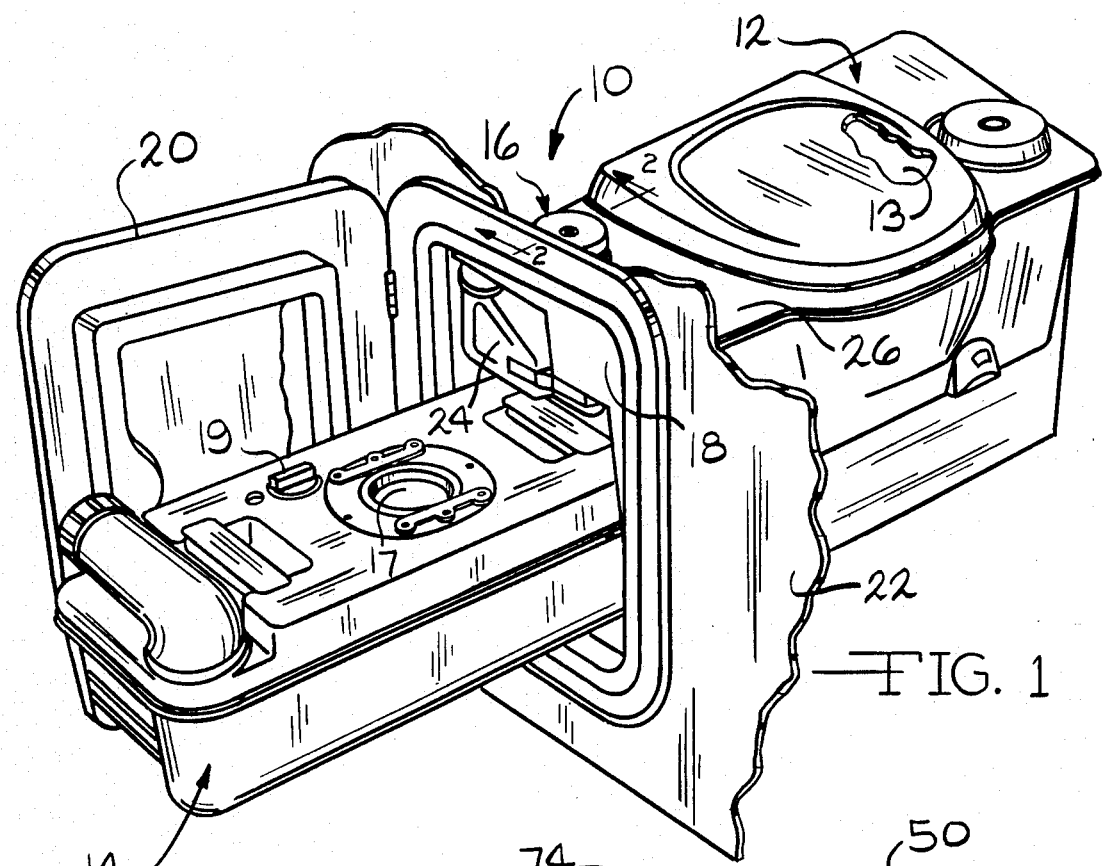
FIG. 1
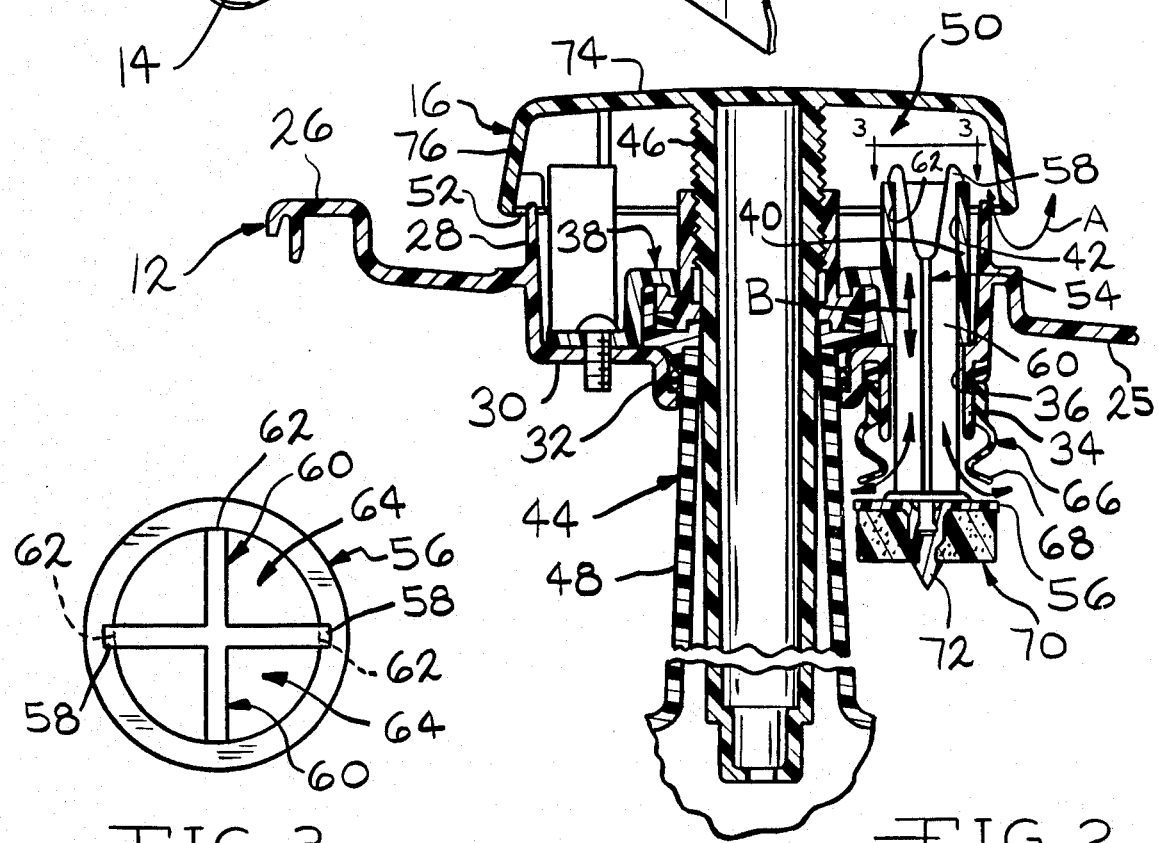
FIG. 3
FIG. 2

VENT STRUCTURE FOR FLUSH WATER HOLDING TANK OF VEHICLE TOILETS

CROSS REFERENCE TO PENDING APPLICATION

This application relates to pending U.S. Patent Application Ser. No. 001,352, filed Jan. 8, 1987 and entitled "Seal for Self-Contained Sanitary System" which is a continuation in part of Ser. No. 870,800, filed June 5, 1986 and entitled "Improvements of Self-Contained Sanitary Systems", each being assigned to the assignee of the present application and each hereby incorporated herein by reference.

BACKGROUND AND SUMMARY OF THE INVENTION

This invention relates generally to sanitation systems for mobile homes and in particular to an improved vent structure for the flush water holding tank in such a system to allow air to pass into and out of the tank while preventing water from escaping through the vent structure.

The above referenced patent applications disclose a cassette type sanitary system particularly adapted to be mounted within the interior compartment of a mobile recreational vehicle (RV). Wastes generated during use of the sanitary system are deposited in a holding tank which can be conveniently removed from the RV through an exterior access door where it can be transported to a disposal site and emptied.

This application is particularly directed to an improved vent structure for the flush water holding tank to provide for a flow of air to the tank to replace water removed for toilet bowl flushing purposes and to provide resistance to water leakage from the tank when the RV is moving or parked on an incline. Briefly, the vent structure includes a cylindrical boss extending through the top wall of the tank and having an axial bore therethrough. The boss is located in a well formed at a high point in the top wall and the well is covered by a cap. The cap is in turn integrally connected to an actuating shaft that is operable to open and close the waste inlet valve for the waste holding tank.

A float member including a buoyant body is mounted for reciprocation within the boss, one end of the float member extending above the boss and the other end receiving the buoyant body and extending into the tank and a seal arrangement for closing off the flow of vent air when the float member is buoyed upwardly by the buoyant body as a result of the flush water changing its position in the tank such as from being parked on an incline or being bounced by movement of the RV. A flow path for vent air is defined through the tank and the bore to equalize the interior pressure of the tank with the exterior pressure. Upward movement of the float member seals the bore and prevents water from escaping through the boss around the top wall.

A benefit of such a vent structure is that functions of flush and venting are conveniently positioned at one location thereby combining functions and reducing parts to be installed or stocked for repair, saving time in construction, and providing a product the surfaces of which are substantially unobstructed by additional ports and sealing caps so as to be easy to maintain and clean, be appealing and present the interior of the RV with an efficient product.

Other benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

FIG. 1 is a pictorial view of a self-contained RV sanitary system of the type with which this invention is particularly adapted.

FIG. 2 is an enlarged sectional view through the top wall of the waste holding tank shown in FIG. 1 showing the vent structure according to this invention.

FIG. 3 is an end view taken along lines 3—3 of FIG. 2.

DETAILED DESCRIPTION OF THE INVENTION

FIG. 1 illustrates a self-contained RV sanitary system 10 of the type with which this invention is particularly adapted to be used. Sanitary system 10 is described in detail in the above mentioned applications. Consequently, the specific configuration details of sanitary system 10 in its entirety will not be described herein but will be confined to the elements related to the improvements according to the present invention.

Sanitary system 10 principally includes bench structure 12 and waste holding tank 14. As shown in FIG. 1 bench structure 12 is a toilet of the type particularly adapted for use within an RV although other configurations could be used such as those functioning as a sink. Bench structure 12 includes a toilet bowl 13 having a conventional lower end outlet opening (not shown) through which wastes are transported to the holding tank 14. An inlet opening 15 is provided in the holding tank 14, and in the operative position of tank 14, the opening 15 is located directly below the toilet bowl outlet opening. A valve 17 is operable to open and close the opening in response to rotation of an actuator shaft 19.

Holding tank 14 fits within storage compartment 18 having access door 20 within RV outer wall 22. Waste holding tank 14 is adapted to be removably received within storage compartment 18. FIG. 1 illustrates access door 20 opened and waste holding tank 14 being withdrawn (or reinserted). The removability feature of tank 14 enables it to be emptied at an appropriate disposal site in a convenient manner.

Bench structure 12 further includes a flush water holding tank 25 for flushing the toilet bowl including a fill container 24 which may be rotated outwardly when access door 20 is opened to enable convenient filling with fresh flush water. An actuator cap 16 interiorly of the RV is operatively connected through an actuator stem 44 (FIG. 2) to the actuator bar 19 for valve 17 in the operative position of the tank 14. This enables convenient operation of the holding tank valve 17 by the toilet user.

FIG. 2 illustrates in section a portion of the actuator stem 44 from the valve assembly journaled for rotation in a top wall 26 of the bench structure and includes a top portion 46 extending above the top wall and connected to cap 16. A bottom portion 48 extends into the flush tank the top portion having the cap 16 integrally formed therewith.

The top wall includes an outer cylindrical boss 28, an inner cylindrical boss 32, and a support 30 defining a depression or well coaxially about the actuator axis. An insert 38 is coaxially disposed in the depression and has flanges arranged above the wall 28 to define a journal for the actuator 44. A cylindrical boss 34 having central bore 36 extends downwardly of the top wall into the tank, the boss having its axis radially outward from the inner cylindrical boss 32.

Actuator cap 16 includes a flat circular head 74 and an annular skirt 76 extending downwardly therefrom such that the free downward annular edge of the skirt is spaced axially from top wall 26 and radially from the boss 28 extending upwardly from the top wall, the skirt defining an annular gap 52 leading to an interior chamber 50 enclosed by the cap.

A vent structure to equalize the air pressure in tank 24 with atmospheric pressure includes a cylindrical boss 40 including a central bore 42 and an axially reciprocable float member 54 having a buoyant body 70 being adapted to sealingly close the bore leading into the fill container. The boss 40 is radially spaced from actuator portion 44 and integral with the insert 38, the boss extending upwardly from the wall and inwardly of the flush container 24. The bore 42 constrains the float member for reciprocation vertically upwardly or downwardly depending on the level of the flush water. A common bore is defined for the float member by bosses 34, 40 and their bores 36, 40.

The float member 54 is formed of a lightweight polymer and includes a flat circular base 56 and an upright stem comprised of four planar longitudinally extending fins 60, each fin extending perpendicularly from its attachment to the base and terminating in a free end, two coplanar fins being longer and the free ends defining a head 58 which extends above the seats on the end face of the boss 40. The fins form a cruciform or "X" shaped section, each fin having a free longitudinal edge 62 adapted to confront but be spaced from the inner walls 42, 36. The shaped end portions deflect radially inward to allow the float to be inserted upwardly into and through the bore 36 and bore 42. A spear portion 72 extends from base 56 to engage the buoyant member and provide a mass for the float member.

The buoyant boy 70 is attached to and extends downwardly from the base 56, the body comprising an annulus of an elastomeric material, shown as a cellular foam. The float member 54 and buoyant body 70 are selected to be lightweight having a density less than that of water such that when there is a change in the water level, the water will engage the buoyant body and the float member will rise or fall.

A seal 66 secured to and extending downwardly from cylindrical boss 34 defines an axially collapsible bellows the free end 68 of which retracts and forms a 360° seal about the basewhen the float member 52 is driven upwardly in the common bore by the buoyant body.

FIG. 3 shows the float member 54 as seen locking downwardly from the top end thereof and including the base 56, the fins 60 two of which having a head 58 which seats on the boss 40, the edges 62 dimensioned to be spaced from the inner walls defined by bores 42, 36 an four passages 64 formed between adjacent fins.

An air path, shown in FIG. 2 by the arrows "A", allows air at atmospheric pressure from outside the cap 16 to pass through gap 52 into the interior chamber 50 thereof, downwardly through the bores 42, 36 and within the passages 64 defined between adjacent fins 60, and past the seal 66 into the fill container. When the water in the tank rises, the float rises. When the water rise is sufficient to escape through the air path, the seal is engaged by the base and collapses upwardly whereby the seal closes 360° about the base.

While the above illustrates a preferred embodiment of the invention, it is to be understood that changes and modifications can be made. For example, the fins can be integrally formed, separately provided, and more or fewer fins could be provided. A single planar fin having heads 58 could be useful if weight and buoyancy of the float member is a problem. A body of elastomeric material could be disposed on the top of the base such that upward movement of the float member would bring a top face of the elastomer into sealing relation with the bottom end face of the cylindrical boss 34 disposed interiorly of the container.

What is claimed is:

1. In a sanitary system for a mobile vehicle of the type including a bench structure, and a storage tank filled with water for flushing waste from the bench, an improved vent structure for allowing air to flow into and escape from said storage tank and preventing fluid from passing out of said tank, comprising
   a boss including a central bore that is normally open to permit air from the atmosphere to pass into the tank, a float member mounted in said bore for movement from a first position wherein the bore is open and to a second position to close the bore and prevent water in the tank from passing therethrough when the float is acted upon a rise in the water level in the tank, and a deformable seal member mounted on said boss and located interiorly of said tank for effecting a 360° seal between said boss and said float member upon movement of said float member to said second position.

2. The sanitary system as recited in claim 1 wherein said seal member comprises an axially collapsible bellows of deformable material secured to the boss interiorly of said tank, and said float member includes a flat circular base adapted to complete a 360° engagement with the bellows when the float member moves to the second position.

3. The sanitary system as recited in claim 2 wherein said base has a top and a bottom face the buoyant body is secured to the bottom face to engage the water, and the seal engages an annular margin of the top face.

4. In a recreational vehicle which includes a fresh water storage tank within the vehicle body, the improvement which comprises a vent structure including a boss having an axial bore that is normally open to pass air from the atmosphere into the tank but is self-closing to prevent water from passing therethrough as a result of splashing of the water in the tank, a buoyant body in the tank vertically rising to cover the bore as a result of water in the tank rising beyond a predetermined level, an upright stem on said body guidably mounted in said bore, said upright stem having a plurality of radially extending flat fins which confront said bore so that the bore constrains the stem for substantially vertical reciprocation within said bore, said fins defining passages therebetween for the flow of air into and out of said tank when said bore is open.

5. The vehicle as recited in claim 4 including a float member comprised of a material having a density less than water disposed for reciprocation in said bore and including said stem extending above the bore for preventing downward retraction, and a base extending below the bore and into the tank, said buoyant body beimg mounted to said base.

6. The vehicle as recited in claim 5 including seal means for sealing 360° around and between the base and the bore, said seal means including a seal member extending coaxially about said boss and adapted to collapse upon upward buoyant vertical movement of the float member.

7. In a recreational vehicle which includes a fresh water storage tank within the vehicle body, the improvement which comprises a vent structure including a boss having an axial bore that is normally open to pass air from the atmosphere into the tank but is self-closing to prevent water from passing therethrough as a result of splashing of the water in the tank, a buoyant body in the tank vertically rising to cover the bore as a result of water in the tank rising beyond a predetermined level, an upright stem on said body guidably mounted in said bore, a float member comprised of a material having a density less than water disposed for reciprocation in said bore and including said stem extending above the bore for preventing downward retraction, and a base extending below the bore and into the tank, said buoyant body being mounted to said base, said stem including a plurality of flat fins extending upwardly from the base, two of said fins being constructed to flex radially towards one another in response to inward insertion into said bore and radially outward to seat on the end of said bore to prevent unwanted movement of the float downwardly in the tank.

* * * * *

UNITED STATES PATENT AND TRADEMARK OFFICE
CERTIFICATE OF CORRECTION

PATENT NO. : 4,805,660

DATED : February 21, 1989

INVENTOR(S) : John M. Antos, David B. Cameron

It is certified that error appears in the above-identified patent and that said Letters Patent is hereby corrected as shown below:

Column 3, line 43, "boy" should be --body--.
Column 4, line 68, "beimg" should be --being--.

Signed and Sealed this

Twenty-sixth Day of December, 1989

Attest:

JEFFREY M. SAMUELS

Attesting Officer     Acting Commissioner of Patents and Trademarks